United States Patent
Guo et al.

(10) Patent No.: US 10,888,821 B2
(45) Date of Patent: Jan. 12, 2021

(54) METHOD FOR TREATING A MICROPOROUS MEMBRANE

(71) Applicant: PPG Industries Ohio, Inc., Cleveland, OH (US)

(72) Inventors: Qunhui Guo, Murrysville, PA (US); Steven E. Bowles, Pittsburgh, PA (US); Cynthia Kutchko, Pittsburgh, PA (US); Deena M. McHenry, Cranberry Township, PA (US); Kurt G. Olson, Gibsonia, PA (US); James C. Peters, Pittsburgh, PA (US); David N. Walters, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 16/131,775

(22) Filed: Sep. 14, 2018

(65) Prior Publication Data

US 2020/0086278 A1    Mar. 19, 2020

(51) Int. Cl.
| | | |
|---|---|---|
| *B01D 65/08* | (2006.01) | |
| *B01D 67/00* | (2006.01) | |
| *B01D 69/14* | (2006.01) | |
| *B01D 71/26* | (2006.01) | |
| *C02F 1/44* | (2006.01) | |
| *C09D 133/12* | (2006.01) | |
| *B01D 63/10* | (2006.01) | |
| *C08J 7/04* | (2020.01) | |
| *C02F 101/32* | (2006.01) | |

(52) U.S. Cl.
CPC ......... *B01D 67/0093* (2013.01); *B01D 63/10* (2013.01); *B01D 65/08* (2013.01); *B01D 67/0095* (2013.01); *B01D 69/148* (2013.01); *B01D 71/26* (2013.01); *C02F 1/44* (2013.01); *C08J 7/0427* (2020.01); *C09D 133/12* (2013.01); *C02F 2101/32* (2013.01); *C08J 2323/06* (2013.01); *C08J 2433/12* (2013.01); *C08J 2439/06* (2013.01)

(58) Field of Classification Search
None
See application file for complete search history.

(56) References Cited

U.S. PATENT DOCUMENTS

| | | | |
|---|---|---|---|
| 2,940,830 A | 6/1960 | Thornhill et al. | |
| 4,681,750 A | 7/1987 | Johnson et al. | |
| 4,886,836 A * | 12/1989 | Gsell ................ | G01N 33/54393 521/53 |
| 5,196,262 A | 3/1993 | Schwarz et al. | |
| 7,455,912 B2 | 11/2008 | Walters et al. | |
| 2003/0036085 A1* | 2/2003 | Salinaro ................. | B01D 69/02 435/6.19 |
| 2004/0262216 A1* | 12/2004 | Hou ..................... | B01D 15/362 210/490 |
| 2007/0099002 A1* | 5/2007 | Walters ................ | C09D 133/14 428/446 |
| 2014/0069862 A1 | 3/2014 | Guo et al. | |
| 2016/0280955 A1 | 9/2016 | Olson et al. | |
| 2018/0133664 A1 | 5/2018 | Guo et al. | |
| 2018/0133686 A1 | 5/2018 | Guo et al. | |

OTHER PUBLICATIONS

1. Liao et al., "Film-formation of polyacrylate/silica composite latexes by sol-gel process", Journal of Applied Polymer Science, 2015, vol. 132, No. 33, pp. 42417 (1-7).
2. Wada et al., "Properties of organic-inorganic composite materials prepared from acrylic resin emulsions and colloida silicas", Journal of Applied Polymer Science, 2006, vol. 101, No. 3, pp. 2051-2056.

* cited by examiner

*Primary Examiner* — Bradley R Spies
(74) *Attorney, Agent, or Firm* — The Webb Law Firm

(57) ABSTRACT

A method for treating a surface of a microporous membrane includes: (1) contacting at least one surface of the membrane with a treatment composition including: (a) an acrylic polymer prepared from a mixture of vinyl monomers including: (i) a (meth)acrylic acid monomer and (ii) a silane-functional acrylic monomer; and (b) a base, where the acrylic polymer is in contact with the filler present in the matrix; and (2) subjecting the membrane of (1) to conditions sufficient to effect a condensation reaction between the filler and the acrylic polymer. A treated microporous membrane and an aqueous treatment composition are also disclosed.

28 Claims, 2 Drawing Sheets

Comparison of Cartridge Flux

Comparison of Permeate Quality

METHOD FOR TREATING A MICROPOROUS MEMBRANE

FIELD OF THE INVENTION

The present invention relates to a method for treating the surface of a microporous membrane and to a treated microporous membrane. The present invention also relates to an aqueous treatment composition.

BACKGROUND OF THE INVENTION

Billions of gallons of co-produced water are drawn up by oil and gas wells each year in the United States. Natural "oil" from a well is actually a multiphase fluid of oil/water/gas. Generally, all three fluids are found in every hydrocarbon well and well effluent.

Because of its value and because of environmental concerns, oil needs to be separated from this effluent. This is usually done through gravitational settling in large tanks, which requires capital and significant space that is not always available onsite. Gas is separated easily in a mechanical separator or by pressure reduction within storage containers. In the case of heavy oils and many emulsified fluid systems, the raw fluids are heated to change the density of the oil and water by heating off lighter ends and essentially agitating their molecular structures so that these fluids can more easily separate. Water then is a byproduct.

Filled microporous membranes are known to be low cost, efficient, and environmentally friendly separation media for the separation of oil from byproduct water as mentioned above. Notwithstanding, as with most filtration media, over a period of time the filtration membranes can become fouled with residual oil and other contaminants. Such fouling can decrease the flux rates and, thus, reduce the efficiency of the filter devices. Hence, it would be desirable to provide a microporous membrane for use as an extended life filtration medium having improved anti-fouling properties while maintaining a high flux rate.

SUMMARY OF THE INVENTION

The present invention is directed to a method for treating a surface of a microporous membrane, the membrane including a polyolefinic polymeric matrix; finely divided particulate, substantially water-insoluble inorganic filler distributed throughout the matrix; and a network of interconnecting pores communicating throughout the microporous membrane, the method including: (1) contacting at least one surface of the membrane with a treatment composition including: (a) an acrylic polymer prepared from a mixture of vinyl monomers including: (i) a (meth)acrylic acid monomer and (ii) a silane-functional acrylic monomer; and (b) a base, where the acrylic polymer is in contact with the filler present in the matrix; and (2) subjecting the membrane of (1) to conditions sufficient to effect a condensation reaction between the filler and the acrylic polymer.

The present invention is also directed to an aqueous treatment composition including: (a) an acrylic polymer prepared from a mixture of vinyl monomers including: (i) a (meth)acrylic acid monomer and (ii) a silane-functional acrylic monomer; (b) a base; (c) a hydrophilic polymer different from the acrylic polymer; and optionally (d) an aminosilane.

DESCRIPTION OF THE INVENTION

Figure 1:
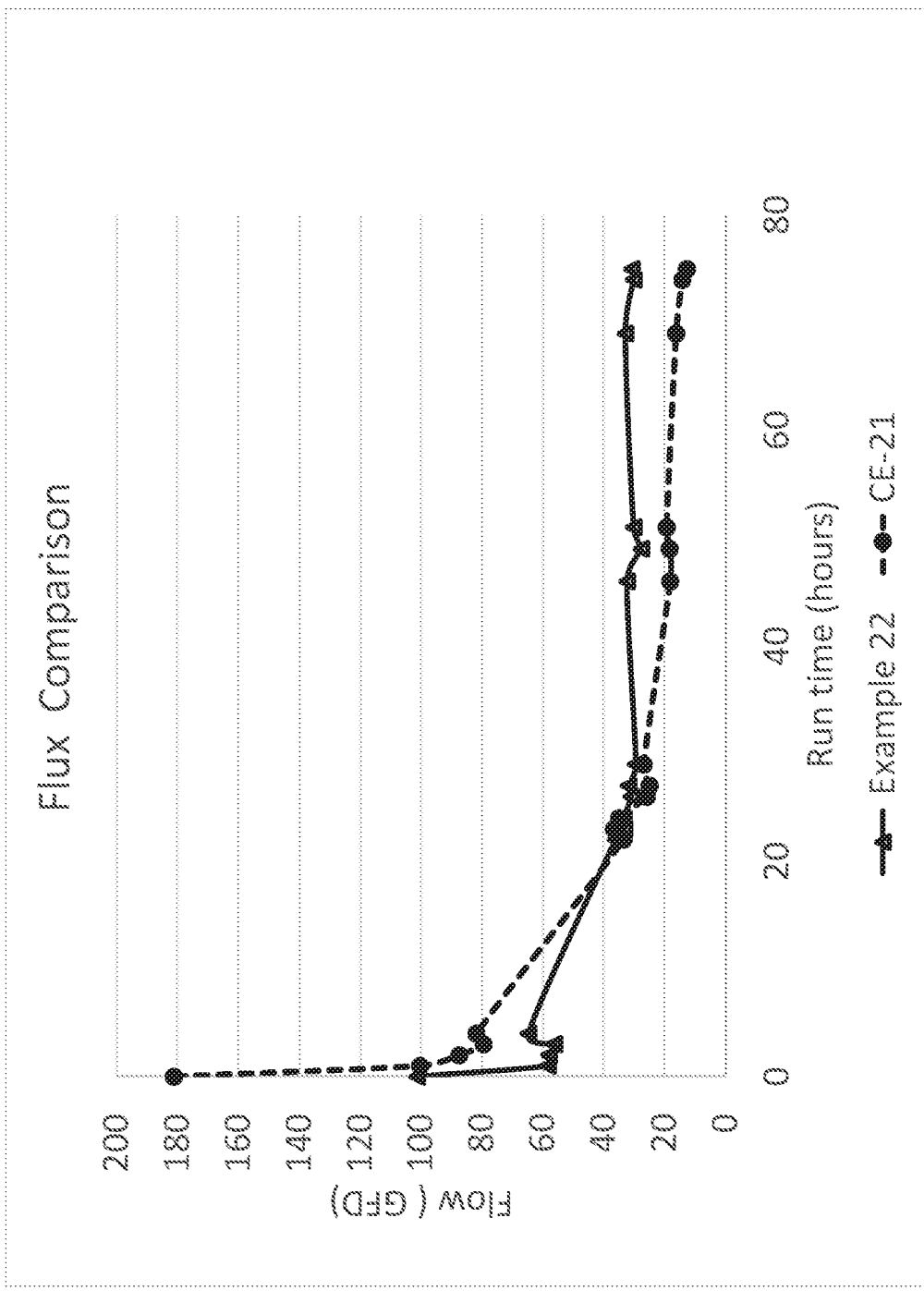
FIG. 1 shows a graph of a flux comparison for Comparative Example 21 and Example 22.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" additive, "a" silica, and the like refer to one or more of these items. Also, as used herein, the term "polymer" is meant to refer to prepolymers, oligomers, and both homopolymers and copolymers. The term "resin" is used interchangeably with "polymer."

As used herein, the transitional term "comprising" (and other comparable terms, e.g., "containing" and "including") is "open-ended" and is used in reference to compositions, methods, and respective component(s) thereof that are essential to the invention, yet open to the inclusion of unspecified matter. The term "consisting essentially of" refers to those component(s) required for a given embodiment and permits the presence of component(s) that do not materially affect the properties or functional characteristic(s) of that embodiment. The term "consisting of" refers to compositions and methods that are exclusive of any other component not recited in that description of the embodiment.

The present invention is directed to a method for treating a surface of a microporous membrane, the membrane comprising a polyolefinic polymeric matrix; finely divided particulate, substantially water-insoluble inorganic filler distributed throughout the matrix; and a network of interconnecting pores communicating throughout the microporous membrane. The method includes the following steps: (1) contacting at least one surface of the membrane with a treatment composition comprising: (a) an acrylic polymer prepared from a mixture of vinyl monomers comprising: (i) a (meth)acrylic acid monomer and (ii) a silane-functional acrylic monomer; and (b) a base in a sufficient quantity to accomplish at least 100% neutralization of the (meth)acrylic acid monomer, wherein the acrylic polymer is in contact with the filler present in the matrix; and (2) subjecting the membrane of (1) to conditions sufficient to effect a condensation reaction between the filler and the acrylic polymer.

As used herein, "microporous material" or "microporous membrane" or "microporous sheet" means a material having a network of interconnecting pores, wherein, on a treatment-free, coating-free, printing ink-free, impregnant-free, and pre-bonding basis, the pores have a volume average diameter ranging from 0.001 to 1.0 micrometer, and constitute at least 5 percent by volume of the microporous material as discussed herein below.

The polyolefinic polymeric matrix can comprise any of a number of known polyolefinic materials known in the art. In some instances, a different polymer derived from at least one ethylenically unsaturated monomer may be used in combination with the polyolefinic polymers. Suitable examples of such polyolefinic polymers can include, but are not limited to, polymers derived from ethylene, propylene, and/or butene, such as polyethylene, polypropylene, and polybutene. High density and/or ultrahigh molecular weight polyolefins, such as high density polyethylene, are also suitable. The polyolefin matrix also can comprise a copolymer, for example, a copolymer of ethylene and butene or a copolymer of ethylene and propylene.

Non-limiting examples of ultrahigh molecular weight (UHMW) polyolefin can include essentially linear UHMW polyethylene (PE) or polypropylene (PP). Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often, the degree of isotacticity of such polymer is at least 95 percent, e.g., at least 98 percent.

While there is no particular restriction on the upper limit of the intrinsic viscosity of the UHMW polyethylene, in one non-limiting example, the intrinsic viscosity can range from 18 to 50 deciliters/gram, e.g., from 18 to 45 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

For purposes of the present invention, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation:

$$M=5.37\times10^4[\eta]^{1.37}$$

wherein M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M=8.88\times10^4[\eta]^{1.25}$$

wherein M is the nominal molecular weight and $[\eta]$ is the intrinsic viscosity of the UHMW polypropylene expressed in deciliters/gram.

A mixture of substantially linear ultrahigh molecular weight polyethylene and lower molecular weight polyethylene can be used. For example, the UHMW polyethylene can have an intrinsic viscosity of at least 10 deciliters/gram, and the lower molecular weight polyethylene can have an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262, which disclosure is incorporated herein by reference. More particularly, the weight percent of UHMW polyethylene used is described in relation to FIG. 6 of U.S. Pat. No. 5,196,262; namely, with reference to the polygons ABCDEF, GHCI or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities are found in the following table.

| Type | Abbreviation | Density (g/cm³) |
| --- | --- | --- |
| Low Density PE | LDPE | 0.910-0.925 |
| Medium Density PE | MDPE | 0.926-0.940 |
| High Density PE | HDPE | 0.941-0.965 |

The UHMWPE and the LMWPE may together constitute at least 65 percent by weight, e.g., at least 85 percent by weight, of the polyolefin polymer of the microporous material. Also, the UHMWPE and LMWPE together may constitute substantially 100 percent by weight of the polyolefin polymer of the microporous material. In some examples, the UHMWPE may constitute substantially 100% (e.g., at least 99%) by weight of the polyolefin polymer of the microporous material.

Typically, the polyolefinic polymeric matrix can comprise a polyolefin comprising ultrahigh molecular weight polyethylene, ultrahigh molecular weight polypropylene, high density polyethylene, high density polypropylene, or mixtures thereof.

If desired, other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, or copolymers of ethylene and methacrylic acid. If desired, all or a portion of the carboxyl groups of carboxyl-containing copolymers can be neutralized with sodium, zinc, or the like. Generally, the microporous material comprises at least 70 percent by weight of UHMW polyolefin, based on the weight of the matrix. In a non-limiting embodiment, the above-described other thermoplastic organic polymer are substantially absent from the matrix of the microporous material.

The microporous membranes of the present invention further comprise finely divided, particulate, substantially water-insoluble inorganic filler distributed throughout the matrix.

The inorganic filler can include any of a number of inorganic fillers known in the art, provided that the filler is capable of undergoing a condensation reaction with the acrylic polymer present in the treatment composition which is applied to the membrane in (1). The filler should be finely divided and substantially water insoluble to permit uniform distribution throughout the polyolefinic polymeric matrix during manufacture of the microporous material. Generally, the inorganic filler is selected from the group consisting of silica, alumina, calcium oxide, zinc oxide, magnesium oxide, titanium oxide, zirconium oxide, and mixtures thereof.

The finely divided substantially water-insoluble filler may be in the form of ultimate particles, aggregates of ultimate particles, or a combination of both. At least 90 percent by weight of the filler used in preparing the microporous material has gross particle sizes in the range of from 5 to 40 micrometers, as determined by the use of a laser diffraction particle size instrument, LS230 from Beckman Coulton, capable of measuring particle diameters as small as 0.04 micron. Typically, at least 90 percent by weight of the filler has gross particle sizes in the range of from 10 to 30 micrometers. The sizes of the filler agglomerates may be reduced during processing of the ingredients used to prepare the microporous material. Accordingly, the distribution of gross particle sizes in the microporous material may be smaller than in the raw filler itself.

As mentioned previously, the filler particles are substantially water-insoluble, and also can be substantially insoluble in any organic processing liquid used to prepare the microporous material. This can facilitate retention of the filler in the microporous material.

In addition to the fillers, other finely divided particulate substantially water-insoluble materials optionally may also be employed. Non-limiting examples of such optional materials can include carbon black, charcoal, graphite, iron oxide, copper oxide, antimony oxide, molybdenum disulfide, zinc sulfide, barium sulfate, strontium sulfate, calcium carbonate, or magnesium carbonate. In one non-limiting embodiment, silica and any one or more of the aforementioned optional filler materials can comprise the filler.

The filler typically has a high surface area allowing the filler to carry much of the processing plasticizer used to form the microporous material. High surface area fillers are materials of very small particle size, materials that have a high degree of porosity, or materials that exhibit both characteristics. The surface area of the filler particles can range from 20 to 900 square meters per gram, e.g., from 25 to 850 square meters per gram, as determined by the Brunauer, Emmett, Teller (BET) method according to ASTM C 819-77 using nitrogen as the adsorbate but modified by outgassing the system and the sample for one hour at 130° C. Prior to nitrogen sorption, filler samples are dried by heating to 160° C. in flowing nitrogen (PS) for 1 hour.

In a particular embodiment of the present invention, the inorganic filler comprises silica, for example, precipitated silica, silica gel, or fumed silica.

Silica gel is generally produced commercially by acidifying an aqueous solution of a soluble metal silicate, e.g., sodium silicate at low pH with acid. The acid employed is generally a strong mineral acid, such as sulfuric acid or hydrochloric acid, although carbon dioxide can be used. Inasmuch as there is essentially no difference in density between the gel phase and the surrounding liquid phase while the viscosity is low, the gel phase does not settle out, that is to say, it does not precipitate. Consequently, silica gel may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight.

Precipitated silica generally is produced commercially by combining an aqueous solution of a soluble metal silicate, ordinarily alkali metal silicate such as sodium silicate, and an acid so that colloidal particles of silica will grow in a weakly alkaline solution and be coagulated by the alkali metal ions of the resulting soluble alkali metal salt. Various acids may be used, including but not limited to mineral acids. Non-limiting examples of acids that can be used include hydrochloric acid and sulfuric acid, but carbon dioxide can also be used to produce precipitated silica. In the absence of a coagulant, silica is not precipitated from solution at any pH. In a non-limiting embodiment, the coagulant used to effect precipitation of silica may be the soluble alkali metal salt produced during formation of the colloidal silica particles, or it may be an added electrolyte, such as a soluble inorganic or organic salt, or it may be a combination of both.

Precipitated silica can be described as precipitated aggregates of ultimate particles of colloidal amorphous silica that have not at any point existed as macroscopic gel during the preparation. The sizes of the aggregates and the degree of hydration may vary widely. Precipitated silica powders differ from silica gels that have been pulverized in that the precipitated silica powders generally have a more open structure, that is, a higher specific pore volume. However, the specific surface area of precipitated silica, as measured by the Brunauer, Emmet, Teller (BET) method using nitrogen as the adsorbate, is often lower than that of silica gel.

Many different precipitated silicas can be employed as the filler used to prepare the microporous material. Precipitated silicas are well-known commercial materials, and processes for producing them are described in detail in many United States patents, including U.S. Pat. Nos. 2,940,830 and 4,681,750. The average ultimate particle size (irrespective of whether or not the ultimate particles are agglomerated) of precipitated silicas used is generally less than 0.1 micrometer, e.g., less than 0.05 micrometer or less than 0.03 micrometer, as determined by transmission electron microscopy. Non-limiting examples of suitable precipitated silicas include those sold under the HI-SIL tradename by PPG Industries, Inc. (Pittsburgh, Pa.).

The inorganic filler particles can constitute from 10 to 90 percent by weight of the microporous membrane. For example, such filler particles can constitute from 25 to 90 percent by weight of the microporous membrane, such as from 30 percent to 90 percent by weight of the microporous membrane, or from 40 to 90 percent by weight of the microporous membrane, or from 50 to 90 percent by weight of the microporous membrane, and even from 60 percent to 90 percent by weight of the microporous membrane. The filler typically is present in the microporous membrane of the present invention in an amount ranging from 50 percent to 85 percent by weight of the microporous membrane. Often, the weight ratio of filler to polyolefin in the microporous material ranges from 0.5:1 to 10:1, such as 1.7:1 to 3.5:1. Alternatively, the weight ratio of filler to polyolefin in the microporous material may be greater than 4:1. It is contemplated that higher levels of filler may be employed, as such levels of filler would provide higher surface area available for condensation reactions with the treatment compositions.

The microporous material used in the membrane of the present invention further comprises a network of interconnecting pores communicating throughout the microporous material.

On a treatment-free, coating free, or impregnant-free basis, such pores can comprise at least 5 percent by volume, e.g. from at least 5 to 95 percent by volume, or from at least 15 to 95 percent by volume, or from at least 20 to 95 percent by volume, or from at least 25 to 95 percent by volume, or from 35 to 70 percent by volume of the microporous material. Often, the pores comprise at least 35 percent by volume, or even at least 45 percent by volume of the microporous material. Such high porosity provides higher surface area throughout the microporous material, which in turn facilitates removal of contaminants from a fluid stream and higher flux rates of a fluid stream through the membrane.

As used herein and in the claims, the porosity (also known as void volume) of the microporous material, expressed as percent by volume, is determined according to the following equation:

$$\text{Porosity} = 100[1 - d_1/d_2]$$

wherein $d_1$ is the density of the sample, which is determined from the sample weight and the sample volume as ascertained from measurements of the sample dimensions, and $d_2$ is the density of the solid portion of the sample, which is determined from the sample weight and the volume of the solid portion of the sample. The volume of the solid portion of the sample is determined using a Quantachrome Stereopycnometer (Quantachrome Corporation (Boynton Beach, Fla.)) in accordance with the accompanying operating manual.

Porosity also can be measured using a Gurley Densometer, model 4340, manufactured by GPI Gurley Precision Instruments (Troy, N.Y.). The porosity values reported are a measure of the rate of air flow through a sample or it's resistance to an air flow through the sample. The unit of measure for this method is a "Gurley second" and represents the time in seconds to pass 100 cc of air through a 1 inch square area using a pressure differential of 4.88 inches of water. Lower values equate to less air flow resistance (more air is allowed to pass freely). For purposes of the present invention, the measurements are completed using the procedure listed in the manual for MODEL 4340 Automatic Densometer.

The volume average diameter of the pores of the microporous material can be determined by mercury porosimetry using an Autopore III porosimeter (Micromeritics, Inc. (Norcross, Ga.)) in accordance with the accompanying operating manual. The volume average pore radius for a single scan is automatically determined by the porosimeter. In operating the porosimeter, a scan is made in the high pressure range (from 138 kilopascals absolute to 227 megapascals absolute). If approximately 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d = 2[v_1 r_1/w_1 + v_2 r_2/w_2]/[v_1/w_1 + v_2/w_2]$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan.

In the course of determining the volume average pore diameter of the above procedure, the maximum pore radius detected is sometimes noted. This is taken from the low pressure range scan, if run; otherwise, it is taken from the high pressure range scan. The maximum pore diameter is twice the maximum pore radius. Inasmuch as some production or treatment steps, e.g., coating processes, printing processes, impregnation processes and/or bonding processes, can result in the filling of at least some of the pores of the microporous material, and since some of these processes irreversibly compress the microporous material, the parameters in respect of porosity, volume average diameter of the pores, and maximum pore diameter are determined for the microporous material prior to the application of one or more of such production or treatment steps.

To prepare the microporous materials of the present invention, filler, polyolefin polymer (typically in solid form such as powder or pellets), processing plasticizer, and minor amounts of lubricant and antioxidant are mixed until a substantially uniform mixture is obtained. The weight ratio of filler to polymer employed in forming the mixture is essentially the same as that of the microporous material substrate to be produced. The mixture, together with additional processing plasticizer, is introduced to the heated barrel of a screw extruder. Attached to the extruder is a die, such as a sheeting die, to form the desired end shape.

In an exemplary manufacturing process, when the material is formed into a sheet or film, a continuous sheet or film formed by a die is forwarded to a pair of heated calender rolls acting cooperatively to form a continuous sheet of lesser thickness than the continuous sheet exiting from the die. The final thickness may depend on the desired end-use application. The microporous material may have a thickness ranging from 0.7 to 18 mil (17.8 to 457.2 microns), such as 0.7 to 15 mil (17.8 to 381 microns), or 1 to 10 mil (25.4 to 254 microns), or 5 to 10 mil (127 to 254 microns), and demonstrates a bubble point of 1 to 80 psi based on ethanol.

Optionally, the sheet exiting the calendar rolls may then be stretched in at least one stretching direction above the elastic limit. Stretching may alternatively take place during or immediately after exiting from the sheeting die or during calendaring, or multiple times during the manufacturing process. Stretching may take place before extraction, after extraction, or both. Additionally, stretching may take place during the application of the pre-treatment composition and/or treatment composition, described in more detail below. Stretched microporous material substrate may be produced by stretching the intermediate product in at least one stretching direction above the elastic limit. Usually, the stretch ratio is at least 1.2. In many cases, the stretch ratio is at least 1.5. Preferably it is at least 2. Frequently, the stretch ratio is in the range of from 1.2 to 15. Often, the stretch ratio is in the range of from 1.5 to 10. Usually, the stretch ratio is in the range of from 2 to 6.

The temperatures at which stretching is accomplished may vary widely. Stretching may be accomplished at ambient room temperature, but usually elevated temperatures are employed. The intermediate product may be heated by any of a wide variety of techniques prior to, during, and/or after stretching. Examples of these techniques include radiative heating, such as that provided by electrically heated or gas fired infrared heaters; convective heating, such as that provided by recirculating hot air; and conductive heating, such as that provided by contact with heated rolls. The temperatures which are measured for temperature control purposes may vary according to the apparatus used and personal preference. For example, temperature-measuring devices may be placed to ascertain the temperatures of the surfaces of infrared heaters, the interiors of infrared heaters, the air temperatures of points between the infrared heaters and the intermediate product, the temperatures of circulating hot air at points within the apparatus, the temperature of hot air entering or leaving the apparatus, the temperatures of the surfaces of rolls used in the stretching process, the temperature of heat transfer fluid entering or leaving such rolls, or film surface temperatures. In general, the temperature or temperatures are controlled such that the intermediate product is stretched about evenly so that the variations, if any, in film thickness of the stretched microporous material are within acceptable limits and so that the amount of stretched microporous material outside of those limits is acceptably low. It will be apparent that the temperatures used for control purposes may or may not be close to those of the intermediate product itself since they depend upon the nature of the apparatus used, the locations of the temperature-measuring devices, and the identities of the substances or objects whose temperatures are being measured.

In view of the locations of the heating devices and the line speeds usually employed during stretching, gradients of varying temperatures may or may not be present through the thickness of the intermediate product. Also, because of such line speeds, it is impracticable to measure these temperature gradients. The presence of gradients of varying temperatures, when they occur, makes it unreasonable to refer to a singular film temperature. Accordingly, film surface temperatures, which can be measured, are best used for characterizing the thermal condition of the intermediate product.

The film surface temperatures at which stretching is accomplished may vary widely, but in general they are such that the intermediate product is stretched about evenly, as explained above. In most cases, the film surface temperatures during stretching are in the range of from 20° C. to 220° C. Often, such temperatures are in the range of from 50° C. to 200° C., such as from 75° C. to 180° C.

Stretching may be accomplished in a single step or a plurality of steps as desired. For example, when the intermediate product is to be stretched in a single direction (uniaxial stretching), the stretching may be accomplished by a single stretching step or a sequence of stretching steps until the desired final stretch ratio is attained. Similarly, when the intermediate product is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the intermediate product is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Various types of stretching apparatus are well known and may be used to accomplish stretching of the intermediate product. Uniaxial stretching is usually accomplished by stretching between two rollers, wherein the second or downstream roller rotates at a greater peripheral speed than the first or upstream roller. Uniaxial stretching can also be accomplished on a standard tentering machine. Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where the continuous sheet is being stretched, one stretching direction is at least approximately parallel to the long axis of the sheet (machine direction) and the other stretching direction is at least approximately perpendicular to the machine direction and is in the plane of the sheet (transverse direction).

Stretching the sheets prior to extraction of the processing plasticizer allows for thinner films with larger pore sizes than in microporous materials conventionally processed. It is also believed that stretching of the sheets prior to extraction of the processing plasticizer minimizes thermal shrinkage after processing. It also should be noted that stretching of the microporous membrane can be conducted at any point prior to, during, or subsequent to application of the pre-treatment composition (as described herein below), and/or prior to, during, or subsequent to application of the treatment composition. Stretching of the microporous membrane can occur once or multiple times during the treatment process.

The product passes to a first extraction zone where the processing plasticizer is substantially removed by extraction with an organic liquid, which is a good solvent for the processing plasticizer, a poor solvent for the organic polymer, and more volatile than the processing plasticizer. Usually, but not necessarily, both the processing plasticizer and the organic extraction liquid are substantially immiscible with water. The product then passes to a second extraction zone where the residual organic extraction liquid is substantially removed by steam and/or water. The product is then passed through a forced air dryer for substantial removal of residual water and remaining residual organic extraction liquid. From the dryer, the microporous material may be passed to a take-up roll, when it is in the form of a sheet.

The processing plasticizer has little solvating effect on the thermoplastic organic polymer at 60° C., only a moderate solvating effect at elevated temperatures on the order of 100° C., and a significant solvating effect at elevated temperatures on the order of 200° C. It is a liquid at room temperature and usually it is processing oil, such as paraffinic oil, naphthenic oil, or aromatic oil. Suitable processing oils include those meeting the requirements of ASTM D 2226-82, Types 103 and 104. Those oils which have a pour point of less than 22° C., or less than 10° C., according to ASTM D 97-66 (reapproved 1978) are used most often. Examples of suitable oils include SHELLFLEX 412 and SHELLFLEX 371 oil (Shell Oil Co. (Houston, Tex.)), which are solvent refined and hydrotreated oils derived from naphthenic crude. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used in the process of manufacturing the microporous membrane. Examples of suitable organic extraction liquids include, but are not limited to, 1,1,2-trichloroethylene; perchloroethylene; 1,2-dichloroethane; 1,1,1-trichloroethane; 1,1,2-trichloroethane; methylene chloride; chloroform; 1,1,2-trichloro-1,2,2-trifluoroethane; isopropyl alcohol; diethyl ether; acetone; hexane; heptane and toluene. One or more azeotropes of halogenated hydrocarbons selected from trans-1,2-dichloroethylene, 1,1,1,2,2,3,4,5,5,5-decafluoropentane, and/or 1,1,1,3,3-pentafluorobutane also can be employed. Such materials are available commercially as VERTREL MCA (a binary azeotrope of 1,1,1,2,2,3,4,5,5,5-dihydrodecafluoropentane and trans-1,2-dichloroethylene: 62%/38%) and VERTREL CCA (a ternary azeotrope of 1,1,1,2,2,3,4,5,5,5-dihydrodecafluorpentane, 1,1,1,3,3-pentafluorbutane, and trans-1,2-dichloroethylene: 33%/28%/39%); VERTREL SDG (80-83% trans-1,2-dichloroethylene, 17-20% hydrofluorocarbon mixture), all available from MicroCare Corporation (New Britain, Conn.).

In the above-described process for producing microporous membrane, extrusion and calendering are facilitated when the filler carries much of the processing plasticizer. The capacity of the filler particles to absorb and hold the processing plasticizer is a function of the surface area of the filler. Therefore, the filler typically has a high surface area as discussed above. Inasmuch as it is desirable to essentially retain the filler in the microporous material substrate, the filler should be substantially insoluble in the processing plasticizer and substantially insoluble in the organic extraction liquid when microporous material substrate is produced by the above process. The residual processing plasticizer content is usually less than 15 percent by weight of the resulting microporous material and this may be reduced even further to levels, such as less than 5 percent by weight, by additional extractions using the same or a different organic extraction liquid. The resulting microporous materials may be further processed depending on the desired application.

As previously mentioned, the method for treating a surface of a microporous membrane (as described above), comprises (1) contacting at least one surface of the membrane with a treatment composition including (a) an acrylic polymer prepared from a mixture of vinyl monomers comprising: (i) a (meth)acrylic acid monomer and (ii) a silane-functional acrylic monomer; and (b) a base in a sufficient quantity to accomplish at least 100% neutralization of the (meth)acrylic acid monomer, wherein the acrylic polymer is in contact with the filler present in the matrix and (2) subjecting the membrane of (1) to conditions sufficient to effect a condensation reaction between the inorganic filler and the acrylic polymer of the treatment composition.

The treatment composition for treating the surface of the microporous membrane may include (a) an acrylic polymer and (b) a base. The treatment composition may further include (c) a hydrophilic polymer. The treatment composition may further include (d) an aminosilane.

The treatment composition may be an aqueous treatment composition, with the components of the treatment composition (e.g., (a) acrylic polymer, (b) base, optionally (c) hydrophilic polymer, and optionally (d) aminosilane) dispersed in an aqueous medium. As used herein, an "aqueous medium" refers to a liquid medium comprising at least 50 weight % water, based on the total weight of the liquid medium. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons. The treatment composition may have a pH >7.

The (a) acrylic polymer may be prepared from a mixture of vinyl monomers. The vinyl monomers may include (i) a (meth)acrylic acid monomer and (ii) a silane-functional acrylic monomer. The vinyl monomers may include (iii) N-vinylpyrrolidone. The (i) (meth)acrylic acid monomer may comprise 2-20 weight %, such as 5-10 weight % of the vinyl monomers. The (ii) silane-functional acrylic monomer may comprise 10-80 weight %, such as 20-70 weight %, such as 40-60 weight %, or such as 45-55 weight % of the vinyl monomers. The (iii) N-vinylpyrrolidone may comprises 1-60 weight %, such as 5-40 weight %, such as 5-25 weight %, or such as 5-15 weight % of the vinyl monomers.

Other vinyl monomers may be present to prepare the (a) acrylic polymer, and non-limiting examples may optionally include: methyl (meth)acrylate, ethyl (meth)acrylate, butyl (meth)acrylate, hydroxyethyl (meth)acrylate, hydroxybutyl (meth)acrylate, hydroxypropyl (meth)acrylate, styrene, acrylamide, alkyl substituted acrylamide, 2-ethylhexyl (meth)acrylate, isobornyl (meth)acrylate, cyclohexyl (meth)acrylate, lauryl (meth)acrylate, substituted styrenes, maleic anhydride, or combinations thereof.

As used herein, the term "acrylic" polymer refers to those polymers that are well known to those skilled in the art which result from the polymerization of one or more ethylenically unsaturated polymerizable materials. Acrylic polymers suitable for use in the present invention can be made by any of a variety of methods, as will be understood by those skilled in the art. In certain embodiments, such acrylic polymers are made by addition polymerization of different unsaturated polymerizable materials, at least one of which is the (ii) silane-functional acrylic monomer. The result of such a polymerization is an acrylic polymer that comprises hydrolyzable silane functional groups. Examples of hydrolyzable silane groups include, without limitation, groups having the structure Si—Xn (wherein n is an integer having a value ranging from 1 to 3 and X is selected from chlorine, bromine, iodine, alkoxy esters, and/or acyloxy esters).

The (i) (meth)acrylic acid monomer include acrylic acid, methacrylic acid, or a combination thereof.

Non-limiting examples of the (ii) silane-functional acrylic monomer include: ethylenically unsaturated alkoxy silanes and ethylenically unsaturated acyloxy silanes, more specific examples of which include acrylatoalkoxysilanes, such as gamma-acryloxypropyl trimethoxysilane and gamma-acryloxypropyl triethoxysilane, and methacrylatoalkoxysilanes, such as gamma-methacryloxypropyl trimethoxysilane, gamma-methacryloxypropyl triethoxysilane and gamma-methacryloxypropyl tris-(2-methoxyethoxy) silane; acyloxysilanes, including, for example, acrylato acetoxysilanes, methacrylato acetoxysilanes and ethylenically unsaturated acetoxysilanes, such as acrylatopropyl triacetoxysilane and methacrylatopropyl triacetoxysilane. In certain embodiments, it may be desirable to utilize monomers which, upon addition polymerization, will result in an acrylic polymer in which the Si atoms of the resulting hydrolyzable silyl groups are separated by at least two atoms from the backbone of the polymer. One non-limiting commercial example of a suitable (ii) silane-functional acrylic monomer includes SILQUEST A-174, available from Momentive Performance Materials (Waterford, N.Y.).

The (a) acrylic polymer may have a weight average molecular weight (Mw) of up to 35,000, such as up to 30,000, up to 25,000, or up to 20,000. The Mw may range from 10,000-30,000, such as from 12,000-25,000, 12,000-20,000, 12,000-16,000, or 12,000-15,000. As used herein, Mw is measured by gel permeation chromatography using a polystyrene standard according to ASTM D6579-11 (gel permeation chromatography used to characterize the polymer samples, was performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation; Mw of polymeric samples can be measured by gel permeation chromatography relative to linear polystyrene standards of 800 to 900,000 Da).

The (a) acrylic polymer may be in contact with the filler present in the matrix once the treatment composition is applied to the microporous membrane, such that the membrane may be subjected to conditions sufficient to effect a condensation reaction between the filler and the (a) acrylic polymer.

In some non-limiting examples, the (a) acrylic polymer may comprise 2-10 weight % of the treatment composition.

The (b) base may include any compound capable of neutralizing the (a) (meth)acrylic acid monomer. The (b) base may be included in an amount to at least partially neutralize the (i) (meth)acrylic acid monomer. For example, the (b) base may be included in an amount sufficient to at least 50%, at least 75%, or at least 100% neutralize the (i) (meth)acrylic acid monomer. For example, the (b) base may be included in an amount sufficient to up to 250%, up to 300%, up to 400% neutralize the (i) (meth)acrylic acid monomer. The (b) base may be included in a sufficient quantity in the treatment composition to accomplish 100%-300%, such as 110-250%, or such as 150%-200% neutralization of the (i) (meth)acrylic acid monomer.

Non-limiting examples of the (b) base include an amine (e.g., dimethylethanol amine, dibutyl amine, diisopropyl amine), sodium hydroxide, ammonium hydroxide, and the like. The amine may include a tertiary amine. The (b) base may have a vapor pressure of ≥1 Pa at 20° C., such as ammonium hydroxide, dimethylethanol amine, dibutyl amine, and diisopropyl amine.

The (c) hydrophilic polymer may be different from the (a) acrylic polymer. The (c) hydrophilic polymer may include any of the hydrophilic polymers from US Patent Application Publication No. 2014/0069862, paragraph [0090], such as one or more of a polyoxazoline, including polyalkyloxazolines such as poly(2-ethyl-2-oxazoline), poly(2-methyl-2-oxazoline), and poly(2-methyl/ethyl-2-oxazoline); triblock copolymers based on poly(ethylene glycol)-poly(propylene glycol)-poly(ethylene glycol); polyethyleneimine; polyamide; oxidized polyethylene or its derivatives; polyethyleneoxide; polyethyleneglycol; polyvinylpyrrolidone; polyacrylic acid; polymethacrylic acid; polyethylene glycol derivatives; polypropylene oxide or its derivatives; a copolymer of poly(ethylene glycol) and polyethyleneoxide; polyvinyl alcohol; ethylene vinyl acetate; cellulose or its derivatives; polyimide; hydrogels such as collagen, polypeptides, guar and pectin; polypeptides; poly(meth)acrylates such as poly(2-hydroxyethylmethacrylate); poly(meth)acrylamide; polysaccharides such as chitosan; zwitterionic polymers such as poly(phosphorylcholine) derivatives, polysulfobetaines, and polycarbobetaines; polyampholytes, or polyethylenimine.

In some non-limiting examples, the (c) hydrophilic polymer may comprise 1-10 weight % of the treatment composition.

The (d) aminosilane may include: aminopropyltriethoxysilane, aminopropyltrimethoxysilane, aminobutyltriethoxysilane, aminobutyltrimethoxysilane, aminophenyltrimethoxysilane, 3-aminopropyltris (methoxyethoxyethoxy) silane, 11-aminoundecyltriethoxysilane, 2-(4-pyridylethyl) triethoxysilane, aminopropylsilanetriol, 3-(m-aminophenoxy)propyltrimethoxy silane, 3-aminopropylmethyldiethoxysilane, 3-amino propylmethyldiethoxysilane silane, 3-aminopropyldimethylethoxysilane, or some combination thereof. The (d) aminosilane may include a polyaminosilane. Non-limiting examples of polyaminosilanes include: N-(2-aminoethyl)-3-aminopropyltriethoxysilane, N-(2-aminoethyl)-3-aminopropyl-silanetriol, N-(2-aminoethyl)-3-aminopropylmethyldimethoxysilane, N-(2-aminoethyl)-3-aminoisobutyl methyldimethoxysilane, bis(2-hydroxyethyl)-3-aminopropyltriethoxysilane, diethylaminomethyltriethoxysilane, N,N-diethyl-3-aminopropyl)trimethoxysilane, 3-(N-styrylmethyl-2-aminoethylamino) propyltrimethoxysilane hydrochloride, N-trimethoxysilylpropyl-N,N,N-tri methylammonium chloride, N-(trimethoxysilylethyl)benzyl-N,N,N-trimethylammonium chloride, trimethoxysilylpropyl modified (polyethyleneimine), or some combination thereof.

In some non-limiting examples, the (d) aminosilane may comprise 0.2-1.5 weight % of the treatment composition.

Prior to contacting the treatment composition with at least one surface of the microporous membrane, the microporous membrane may be pre-treated with a pre-treatment composition. The surface of the microporous membrane may be pre-treated by contacting it with a hydrophilic polymer. The hydrophilic polymer pre-treatment composition may include any of the hydrophilic polymers previously described in connection with the (c) hydrophilic polymer. The pre-treated microporous membrane may be dried prior to contacting it with the treatment composition, or the treatment composition may be contacted over the surface wet from the pre-treatment. In some non-limiting examples, the surface of the microporous membrane may be contacted with the hydrophilic polymer after it is contacted with the treatment composition, such that the hydrophobic polymer is used as a post-treatment composition. This may be in addition to using the hydrophobic polymer as a pre-treatment composition or instead of using the hydrophobic polymer as a pre-treatment.

The pre-treatment composition and/or the treatment composition can be (1) contacted with at least one surface of the microporous membrane by any application means known in the art. For example, the treatment composition can be applied to at least one surface of the microporous membrane by immersion, spray, dip, and/or flow or certain application techniques. The treatment composition may be applied after plasticizer extraction and either prior to, during, or after any of the stretching steps previously described. Alternatively, stretching can be delayed until application of the treatment composition.

The treatment composition may be applied over a membrane that is dry. The treatment composition may be applied over a membrane that is pre-wet.

Upon application of the treatment composition to at least one surface of the microporous membrane in (1), the membrane of (1) is (2) subjected to conditions sufficient to effect a condensation reaction between the inorganic filler (e.g., functional groups present on the surface thereof) and the (a) acrylic polymer (e.g., via the silane groups present from the (ii) silane-functional acrylic monomer residue). Such reaction conditions will be discussed in more detail herein below.

The (2) conditions sufficient to effect the condensation reaction may include drying as described hereinafter. The (2) conditions sufficient to effect the condensation reaction may include rinsing the membrane with neutral water.

Further, the treatment composition can be applied in multiple steps. That is, the microporous membrane can be contacted in (1) with one or more applications of the treatment composition(s). Moreover, the treatment compositions applied in such multi-step applications can be the same or different compositions, provided each composition comprises at least one (a) acrylic polymer. It also should be noted that any of the previously described treatment compositions suitable for application to the microporous membrane of (1) in accordance with the method of the present invention can further comprise at least one nonionic surfactant and/or anionic surfactant and/or rheology modifier as described immediately below.

Non-limiting examples of suitable anionic surfactants for use in the treatment composition used in the method of the present invention can include, but are not limited to, sodium stearate, ammonium stearate, ammonium cocoate, sodium laurate, sodium cocyl sarcosinate, sodium lauroyl sarconsinate, sodium soap of tallow, sodium soap of coconut, sodium myristoyl sarcosinate, sodium dioctylsulfosuccinate, or some combination thereof.

The rheology modifier may be pseudoplastic or thixotropic in nature. Non-limiting examples of suitable rheology modifiers for use in the treatment composition used in the method of the present invention can include, but are not limited to, cationic quaternary amine compounds coupled with propylene glycol (such as DISPERSOGEN SPS from Clariant (Muttenz, Switzerland)), aqueous dispersions of acrylic copolymers (such as RHEOTECH 4800 from Arkema Group (Colombes, France)), anionic, aqueous solutions of sodium polyacrylate (such as ALCOGUM 296-W from AkzoNobel (Amsterdam, Netherlands)), or some combination thereof.

Non-limiting examples of suitable nonionic surfactants for use in the treatment composition used in the method of the present invention can include, but are not limited to, polyalkylene oxide alkyl ethers, wherein the alkyl group can be straight chain or branched having a chain length of from C6 to C22; polyalkylene oxide alkyl esters, wherein the alkyl group can be straight chain or branched having a chain length of from C6 to C22; organic amines with straight or branched carbon chains from C6 to C22 having the general formula R*NR'R", wherein R* can be from C8 to C22 alkyl and R' and R" can each independently be H or C1 to C4 alkyl, such that the molecule can be substantially soluble or substantially emulsifiable in water, for example octadecylamine; tertiary amines with carbon chains from C6 to C22; polyethyleneimines; polyacrylamides; glycols and alcohols with straight chain or branched alkyl from C6 to C22 that can form ester linkage (—SiOC—), polyvinyl alcohol; and mixtures thereof.

The nonionic surfactant also can be chosen from polyalkylene oxide ethers such as polypropylene oxide ethers or polyethylene oxide ethers such as but not limited to hexaethylene glycol monododecylether, hexaethylene glycol monohexadecylether, hexaethylene glycol monotetradecylether, hexaethylene glycol monooctadecylether, heptaethylene glycol monododecylether, heptaethylene glycol monohexadecylether, heptaethylene glycol monotetradecylether, heptaethylene glycol monooctadecylether, nonaethylene glycol monododecylether, octaethylene glycol monododecylether; polyalkylene oxide esters, for example polypropylene oxide esters or polyethylene oxide esters such as but not limited to hexaethylene glycol monododecylester, hexaethylene glycol monohexadecylester, hexaethylene glycol monotetradecylester, hexaethylene glycol monooctadecylester, heptaethylene glycol monododecylester, heptaethylene glycol monohexadecylester, heptaethylene glycol monotetradecylester, heptaethylene glycol monooctadecylester, nonaethylene glycol monododecylester, octaethylene glycol monododecylester; polysorbate esters such as polyoxyethylene sorbitan mono fatty acid esters including but not limited to polyoxyethylene sorbitan mono palmitate, polyoxyethylene sorbitan mono oleate, polyoxyethylene sorbitan mono stearate, polyoxyethylene sorbitan difatty acid esters such as polyoxyethylene sorbitan dipalmitate, polyoxyethylene sorbitan dioleate, polyoxyethylene sorbitan distearate, polyoxyethylene sorbitan monopalmitate monooleate, polyoxyethylene sorbitan tri fatty acid esters such as but not limited to polyoxyethylene sorbitan tristearate; or mixtures thereof.

In a particular embodiment, the treatment composition used in the method of the present invention can comprise a nonionic surfactant selected from block copolymers based on poly(ethylene glycol), for example, block copolymers of poly(propylene glycol) and poly(ethylene glycol), (such as the triblock copolymer PLURONIC 17R2 which is commercially available from BASF Corporation (Ludwigshafen, Germany)); cetylstearyl alcohol; polyethylene glycol and derivatives thereof, for example, polyoxyethylene octyl phenyl ether; polyalkyl glycols; cetyl alcohol; cocamide mono- or di-ethanolamine; decyl gylcoside; octylphenoxypolyethoxyethanol; isocetyl alcohol; lauryl glucoside; monolaurin; fatty alcohol polyglycol ethers; polyglycol ethers; polyethylene glycol derivatives of mono or diglycerides; mono and poly glycerol derivatives, for example, polyglycerol polyricinoleate; sorbitan esters; polysorbates and oxidized polyethylene. Mixtures of any of the aforementioned nonionic surfactants can be used.

As discussed above, the method for treating a surface of a filled microporous membrane in accordance with the present invention further comprises (2) subjecting the membrane of (1) to conditions sufficient to effect a condensation reaction between the inorganic filler and the silane-functional polyamine compound.

In a "wet method", the treatment composition can be applied to one or more surfaces of the microporous membrane and rinsed with neutral water to effect the condensation reaction between the inorganic filler and the (a) acrylic polymer. The wet method can be used effectively to treat a microporous membrane which is in the form of a sheet or when the microporous membrane is a component of an existing or pre-fabricated separation device, such as the filter membrane component of a spiral wound or pleated filter device, or a separation membrane as a component of a battery (e.g., a battery separator). The sheet may be pre-wetted or dry prior to the treatment with the treatment composition.

In a "dry method" of effecting the condensation reaction in step (2) of the method of the present invention, the condensation reaction between the inorganic filler and the (a) acrylic polymer is effected by drying the membrane. The dry method may be used when the (b) base has a vapor pressure of ≥1 Pa. The drying may be effected by a temperature in the range of from 20° C. to 145° C. The dry method is particularly useful for treatment of microporous membranes in the form of a sheet. The dry method can be initiated on a microporous membrane prior to any stretching, or after machine direction stretching and prior to a cross direction stretching, or the dry method can be initiated on a microporous membrane that has already undergone biaxial stretching. Also, when the dry method is employed, the microporous membrane may be stretched during the drying/heating step in addition to or instead of stretching prior to treatment with the treatment composition. During application of the treatment composition in the dry method, it should be noted that the microporous membrane to which the respective treatment composition is applied should be held dimensionally stable during said application and drying steps. Further, during the dry method drying/heating steps, the membrane typically is held under tension in order to prevent/minimize shrinkage, regardless of whether the stretching is occurring simultaneously.

The drying temperature to effect the condensation reaction may occur at 20° C.-145° C., such as 20° C.-120° C., such as 20° C.-100° C., or such as 20° C.-95° C. The drying temperature may be up to 145° C., such as up to 120° C., such as up to 100° C., or such as up to 95° C.

The methods for treating a surface of a filled microporous membrane in accordance with the present invention differ significantly from the heretofore known methods where conventional hydrophilic coatings are applied to the surfaces of the microporous membranes. In the methods of the present invention, the components of the treatment composition interact chemically with the inorganic filler at all exposed surfaces in and on the membrane, including within the pores. The components are reacted via condensation to form a permanent surface which imparts hydrophilic character over the entire membrane, including the surfaces of the pores without occluding the pores. Such methods result in the treatment being bound to the surface of the membrane and the interior of the pores via covalent interaction with the inorganic filler particles. Hence, the treatment is not removed by normal physical or chemical usage (e.g., by cleaning with a basic cleaning solution). It has been found that, when used in oil-water separation applications, the membranes prepared by the methods of the present invention exhibit a longer practical lifetime as evidenced by decreased fouling, improved flux rates over extended periods of time, and robustness against cleaning procedures as compared to an equivalent, untreated membrane. Such membranes also can demonstrate lower shrinkage (i.e., the membranes maintain the integrity of the pores) as compared to an equivalent untreated membrane. This is particularly true for the membranes of the present invention, which are prepared using the dry method as mentioned above.

EXAMPLES

The present invention is more particularly described in the following examples which are intended to be illustrative only, since numerous modifications and variations therein will be apparent to those skilled in the art.

Part 1. Substrate Preparation:

Example M-1

An extruded sheet was prepared in accordance with US Pub. No. 2013/0228529A1, Example 4. The extruded sheet was then stretched in both the Machine and Cross Machine Directions. Machine Direction stretching was carried out at 270° F. (132° C.) with a slow draw roll set at 15 FPM and fast draw roll set at 28 FPM. Cross Machine stretching was carried out at 270° F. (132° C.) and a stretching ratio of 2 to 1.

Example M-2

An extruded sheet was prepared in accordance with US Pub. No. 2013/0228529A1, Part I of the Examples, using the ingredients listed in Table 1 below. The extruded sheet was stretched using the same conditions described in Example M-1.

TABLE 1

| Component | Parts by weight |
|---|---|
| HI-SIL WB37[1] | 330 |
| GUR 4170 UHMWPE[2] | 110 |
| TI-PURE R103[3] | 17 |
| SYNPRO 1580[4] | 4 |
| IRGANOX B215[5] | 4 |
| TUFFLO 6056[6] | 835 |

[1]Precipitated silica available commercially from PPG Industries, Inc. (Pittsburgh, PA)
[2]Ultra High Molecular Weight Polyethylene, obtained commercially from Celanese Corporation (Irving, TX) and reported to have a molecular weight of about 10.5 million grams per mole
[3]A rutile titanium dioxide available from The Chemours Company (Wilmington, DE)
[4]A calcium-zinc stearate lubricant, obtained commercially from Valtris Specialty Chemicals (Independence, OH)
[5]A blend of antioxidants, obtained commercially from BASF (Ludwigshafen, Germany)
[6]A processing oil, obtained commercially from PPC Lubricants (Jonestown, PA)

Part 2. Preparation of Acrylic Polymers:

Example 1

An acrylic polymer composition was prepared from the following components listed in Table 2.

TABLE 2

| Component | Parts by weight |
|---|---|
| A | |
| Ethanol 200 Proof | 1145 |
| B | |
| Ethanol 200 Proof | 495.0 |
| Methyl Methacrylate | 109.7 |
| Butyl Acrylate | 0.5 |
| Hydroxyethyl Methacrylate | 0.5 |
| Acrylic acid | 27.5 |
| SILQUEST A-174[7] | 322.3 |
| C | |
| Ethanol 200 Proof | 243.9 |
| 2,2'-azobis(2-methylbutyronitrile) | 19.5 |
| D | |
| Ethanol 200 Proof | 28.8 |
| 2,2'-azobis(2-methylbutyronitrile) | 4.9 |
| E | |
| De-ionized water | 10999.9 |
| Ethanol (90%, 10% water) | 392.0 |
| Sodium dioctyl sulfosuccinate | 13.1 |
| Dimethyl ethanol amine | 46.1 |

[7]Methacryloxypropyltrimethyloxy Silane available from Momentive Performance Materials, Inc. (Waterford, NY)

Charge A was placed into a 4-neck round bottom flask with condenser, nitrogen adaptor, mechanical stirrer, and addition funnel, and the reaction was heated to 80° C. under nitrogen blanket with agitation. Charge B and charge C were then added simultaneously over three hours at reflux then held at reflux for two hours. Charge D was then added over thirty minutes at 80° C. The reaction mixture was held for an additional two hours at 80° C. The clear solution was then cooled to 50° C., and poured into Charge E with agitation over fifteen minutes. The solution was stirred for 30 minutes and then filtered through a 100 micron mesh filter bag. The percent solids were checked by heating a sample at 110° C. for 1 hour in an oven (2.43% solids, theoretical 2.63%) and molecular weight was measured by gel permeation chromatography (GPC) at Mw of 31,301 g/mol.

Example 2

An acrylic polymer acrylic composition was prepared from the following components listed in Table 3.

TABLE 3

| Component | Parts by weight |
|---|---|
| A | |
| Ethanol (95%, 5% methanol) | 2070.0 |
| B | |
| Ethanol (95%, 5% methanol) | 546.3 |
| Methyl Methacrylate | 1057.89 |
| Butyl Acrylate | 2.88 |
| Hydroxyethyl Methacrylate | 2.88 |
| Acrylic acid | 198.38 |
| SILQUEST A-174[7] | 1123.55 |
| N-Vinyl pyrrolidone | 264.50 |
| C | |
| Ethanol (95%, 5% methanol) | 1402.4 |
| 2,2'-azobis(2-methylbutyronitrile) | 112.1 |
| D | |
| Ethanol (95%, 5% methanol) | 165.6 |
| 2,2'-azobis(2-methylbutyronitrile) | 26.2 |
| E | |
| De-ionized water | 20175.0 |
| Ethanol (90%, 10% water) | 1008.6 |
| Sodium dioctyl sulfosuccinate | 71.3 |
| Dimethyl ethanol amine | 486.3 |

The same procedure was followed as in Example 1 above. The percent solids were checked by heating a sample at 110° C. for 1 hour in an oven (10.36% solids, theoretical 10.0). The dispersion was found to have an acid value of 5.55 mg KOH/g and pH 9.44.

Examples 3-8

Part 3. Preparation of Treatment Solutions:

For each of Examples 3 through 8, a polyethylene beaker fitted with an air driven paddle stirrer was charged with the specified amount of water and 2-butoxyethanol then stirred for 5 minutes, with surfactant where indicated, according the amounts in Table 4. The poly(2-ethyl-2-oxazoline), then the polyvinylpyrrolidone were added and stirred for 60 minutes until all the polymer was dissolved. The acrylic polymers of Example 1 or 2 were added slowly, followed by 3-aminoproyl triethoxysilane, where applicable, stirring for 30 minutes after each addition. The pH of each solution was between 9 and 10.

TABLE 4

| Ingredients (parts by weight) | Example 3 | Example 4 | Example 5 | Example 6 | Example 7 | CE-8 |
|---|---|---|---|---|---|---|
| Water | 31.8 | 34.0 | 33.3 | 31.3 | 30.8 | 91.0 |
| 2-Butoxyethanol | 6.0 | 6.0 | 6.0 | 6.0 | 6.0 | 6.0 |

TABLE 4-continued

| Ingredients (parts by weight) | Example 3 | Example 4 | Example 5 | Example 6 | Example 7 | CE-8 |
|---|---|---|---|---|---|---|
| PLURONIC 17R2[8] | — | — | — | — | — | 1.0 |
| Poly(2-ethyl-2-oxazoline)[9] | 0.3 | — | 0.3 | 0.7 | 0.7 | 2.0 |
| Polyvinylpyrrolidone K-90[10] | 2.0 | — | — | 2.0 | 2.0 | — |
| Acrylic polymer of Example 1 | 60.0 | — | — | — | — | — |
| Acrylic polymer of Example 2 | — | 60.0 | 60.0 | 60.0 | 60.0 | — |
| 3-aminopropyl triethoxysilane | — | — | 0.5 | — | 0.5 | — |

[8]A block copolymer surfactant with reported weight average $M_w$ of 2150, available from BASF Corporation (Ludwigshafen, Germany)
[9]Average Molecular weight of 50,000, purchased from SigmaAldrich (St. Louis, MO)
[10]Average Molecular weight of 360,000, purchased from SigmaAldrich (St. Louis, MO)

Examples 9-20

Part 4. Treatment of Membranes:

To prepare each of the examples and comparative examples described below, a sheet of the microporous membrane described in Part 1 was cut to approximately 10.5"×10.5" and clamped to the outer perimeter of a 12"×12" metal frame with 1" binder clips. A quantity of each treatment solution was applied to achieve the target coating weights indicated in Table 5. The framed sample was placed in an oven at the indicated temperature for 10 minutes. The assembly was then allowed to cool to room temperature.

TABLE 5

| Example | Substrate | Treatment solution | Drying temperature (° C.) | Target Coating weight (g/m²) |
|---|---|---|---|---|
| 9 | M-1 | Example 3 | 95 | 281 |
| 10 | M-1 | Example 4 | 95 | 281 |
| 11 | M-1 | Example 5 | 95 | 281 |
| 12 | M-1 | Example 6 | 95 | 281 |
| 13 | M-1 | Example 7 | 95 | 281 |
| 14 | M-1 | Example 7 | 95 | 350 |
| 15 | M-2 | Example 7 | 95 | 281 |
| 16 | M-2 | Example 7 | 115 | 350 |
| 17 | M-2 | Example 6 | 115 | 350 |
| CE-18 | M-1 | CE-8 | 95 | 281 |
| CE-19 | M-1 | None | N/A | N/A |
| CE-20 | M-2 | None | N/A | N/A |

Part 5. Testing of Treated Membranes:

Each of the prepared membranes of Part 4 were tested for properties and performance using the methods described below.

Gurley:

Porosity was determined using a Gurley Precision Densometer, model 4340, manufactured by GPI Gurley Precision Instruments (Troy, N.Y.).

Water Wetting Time:

A 2" by 2" sample was cut and placed on 100 ml of deionized water. The time (in seconds) required to completely wet the membrane sample was recorded.

Water Flux:

Water flux was tested with a Sterlitech filter holder with a membrane area of 90 cm². The Sterlitech unit fitted with the membrane was charged with 1 liter of water and sealed. The air pressure was set to 50 psi and the time required for 1 liter of water to pass through the membrane was recorded. The corresponding water flux was calculated. The non-coated samples CE-19 and CE-20 were pre-wet with a 50/50 water/isopropyl alcohol solution then rinsed with and soaked in deionized water prior to testing.

Oil Resistance Rating:

The water-wetted membrane of interest was removed from the water flux test equipment above and immediately evaluated for oil resistance. Three drops of Texas crude oil (supplied by Texas Raw Crude International (Midland, Tex.)) were placed on the membrane surface using a disposable dropper. All three drops were allowed to remain undisturbed for approximately one minute then wiped off using a paper wipe. If the oil drop penetrated and stained the membrane, the result was given a rating of 1. If the oil drop remained mostly on the surface but clearly stained the membrane, the result was given a rating of 2. If the oil drop remained at the surface, did not penetrate the membrane and/or only slightly stained the surface, the result was given a rating of 3.

Oil Absorption:

A 2 cm by 2 cm coupon of membrane was completely submerged into 100% crude oil for 24 hours. The sample was then removed from the oil bath and all excess oil wiped from the surface. The resultant sample was placed in a beaker filled with 100 ml of hexane, allowed to soak for 5 minutes and then removed. The corresponding oil concentration in the hexane soak was determined with a TD-3100 hydrocarbon analyzer from Turner Design Hydrocarbon Instruments (Fresno, Calif.).

ΔP Oil-Water Extrusion Pressure:

A 200 ml quantity of a 50/50 volume blend of water and Texas crude oil was used for the test along with a filter holder with a membrane area of 90 cm² (available from Sterlitech Corporation (Kent, Wash.)). Once the unit was fully fitted and charged the test was initiated at a pressure of 5 psi and then the pressure was increased at 2.5 psi increments every 10 minutes. The pressures at which water and then oil passed through the membrane were recorded. The difference between these two pressures is recorded in Table 7 as ΔP oil-water. In order to provide good separation of oil and water at reasonable flow rates, the difference in pressure (ΔP) should be at least 10 psi. Low ΔP values correlate to oil-contaminated permeate.

Figure 2:
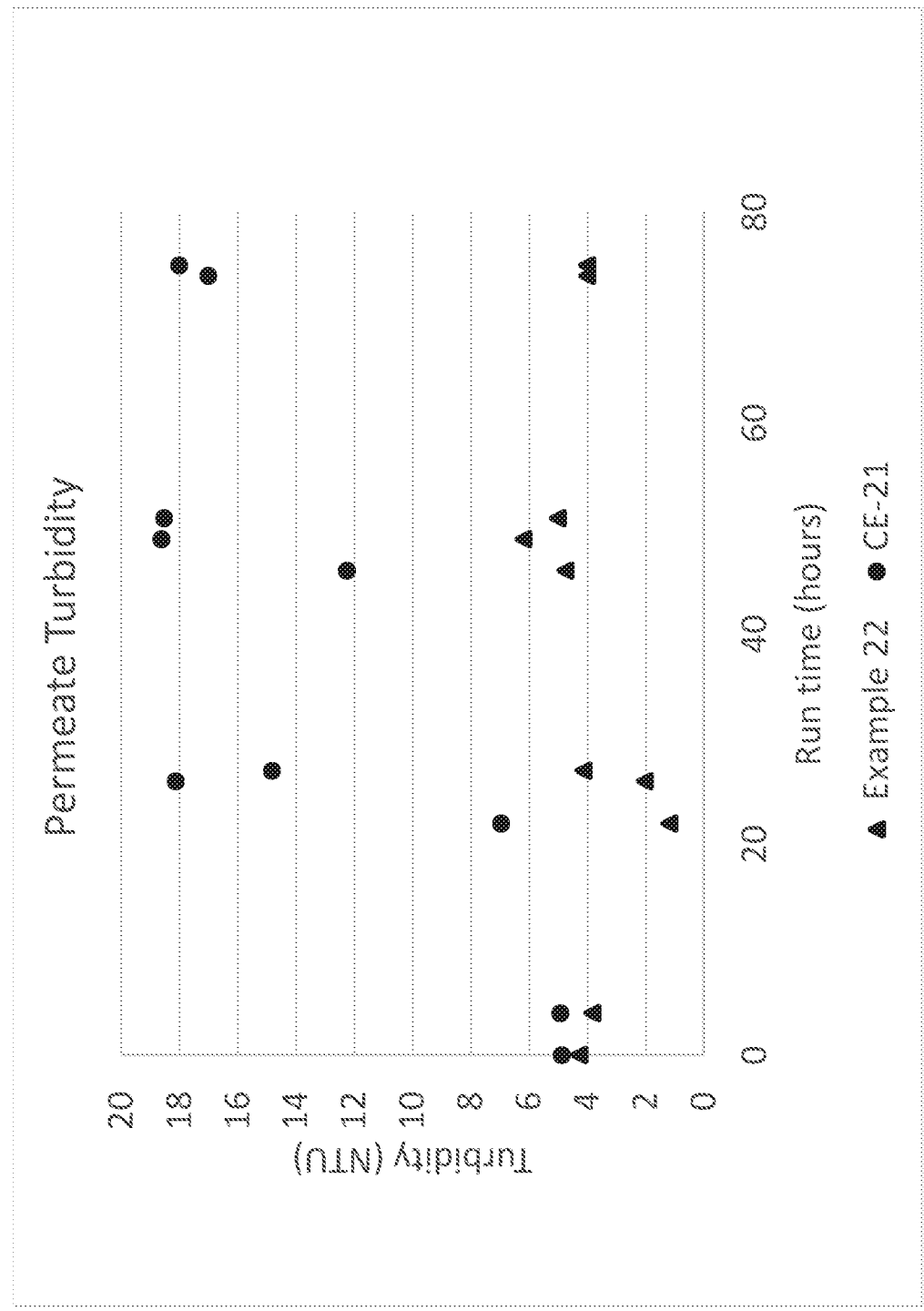
FIG. 2 shows a graph of permeate turbidity for Comparative Example 21 and Example 22.

Shrinkage Rate after Water Boiling:

8 cm by 8 cm sample coupons of the treated materials were used. The coupons were cut from the coated membrane and soaked directly in deionized water for 1 hour, before test, CE-19 and CE-20 were pre-wet with a 50/50 water/isopropyl alcohol solution then rinsed with and soaked in deionized water. All samples were then were boiling in DI water for 2 hours, then the samples were removed from the water bath and air dried at room temperature overnight. The resultant samples were measured 3 times in both the cross (CD) and machine (MD) directions, the values averaged and the shrinkage calculated and reported as a percentage of the original pre-wet sample dimensions.

ppm of oil was added every 24 hours throughout the test to simulate constant use conditions. The permeate flow rate was recorded over time and reported as GFD (Gal/day/ft$^2$). Permeate samples were collected periodically and tested for turbidity using a HACH 2100N Turbidimeter, purchased from the Hach Company (Loveland, Colo.). The results are shown in FIGS. 1 and 2.

TABLE 6

| Example | Gurley (sec) | Wetting time (sec) | Oil resistance rating | Water flux (ml/min/cm$^2$) | Oil absorption (mg/cm$^2$) | ΔP oil-water (psi) | Shrinkage (%) |
|---|---|---|---|---|---|---|---|
| 9 | 44 | 60 | 2 | 6.5 | 10 | 10 | <5 |
| 10 | 58 | 120 | 3 | 4.0 | 10 | 10 | <5 |
| 11 | 70 | 120 | 3 | 5.0 | 10 | 10 | <5 |
| 12 | 57 | 30 | 3 | 8.0 | 5 | 20 | <5 |
| 13 | 62 | 30 | 3 | 4.5 | 5 | 20 | <5 |
| 14 | 90 | 60 | 3 | 4.0 | 10 | 20 | <2.5 |
| 15 | 62 | 30 | 3 | 12.3 | 7 | 20 | <5 |
| 16 | 88 | 60 | 3 | 6.3 | 7 | 20 | <2.5 |
| 17 | 68 | 20 | 3 | 9.0 | 7 | 20 | <2.5 |
| CE-18 | 41 | 10 | 1 | 22 | 15 | 5 | >25 |
| CE-19 | 39 | >300 | 1 | 22 | 15 | 5 | >25 |
| CE-20 | 25 | >300 | 1 | 24 | 15 | 5 | >25 |

The performance results presented in Table 6 illustrate that the microporous membranes prepared by the methods of the present invention demonstrate lower oil absorption, improved oil resistance and greater ΔP versus untreated membranes or membrane treated with the hydrophilic Poly (2-ethyl-2-oxazoline) alone, despite demonstrating lower porosity.

Examples 21-22

Part 6. Treatment and Testing of Fabricated Filtration Cartridge:

For Comparative Example CE-21, the untreated membrane of Example 19 (M-1) was assembled into an industry standard 2514 size spiral wound cartridge with a single leaf design. The cartridge contained 5.4 ft$^2$ of active membrane area with a 43 mil (1090 micron) thick feed space.

For Example 22, the treated membrane of Example 16 was assembled into an identical spiral wound cartridge as described above.

Each of the cartridges of Comparative Example CE-21 and Example 22 were assembled into a 2514 RO membrane housing with ¼ inch port in the feed inlet. A salt/oil/water mixture was used for the testing, the composition of which is detailed in Table 7.

TABLE 7

| Component | Parts by Weight |
|---|---|
| sodium dodecyl benzene sulfonate | 0.01 |
| Texas Crude Oil | 0.5 |
| Water | 99.49 |

The cartridges were tested separately as follows. The solution was pumped through the cartridge being tested at a feed flow of 3 gallons/minute. Both the feed return and permeate were directed back into the original sourcing container and the feed pressure, flow, and temperature were each recorded with time. The cartridges were operated at 15 psi transition membrane pressure (TMP). An additional 300

FIG. 1 demonstrates a more precipitous and steady drop in flux throughout the testing for CE-21 versus the cartridge of Example 22 using the treated membrane. The cartridge of Example 22 demonstrates a more stable flux over time.

As seen in FIG. 2, the cartridge of Example 22 yields a consistently less turbid (lower oil contamination) permeate throughout the testing period, indicating a more efficient elimination of oil in the permeate relative to CE-21.

The invention can be described further in the following clauses.

Clause 1: A method for treating a surface of a microporous membrane, the membrane comprising a polyolefinic polymeric matrix; finely divided particulate, substantially water-insoluble inorganic filler distributed throughout the matrix; and a network of interconnecting pores communicating throughout the microporous membrane, the method comprising: (1) contacting at least one surface of the membrane with a treatment composition comprising: (a) an acrylic polymer prepared from a mixture of vinyl monomers comprising: (i) a (meth)acrylic acid monomer and (ii) a silane-functional acrylic monomer; and (b) a base, wherein the acrylic polymer is in contact with the filler present in the matrix; and (2) subjecting the membrane of (1) to conditions sufficient to effect a condensation reaction between the filler and the acrylic polymer.

Clause 2: The method of clause 1, wherein the mixture of vinyl monomers further comprises (iii) N-vinylpyrrolidone.

Clause 3: The method of clause 1 or 2, wherein the silane-functional acrylic monomer comprises 10-80 weight % of the vinyl monomers.

Clause 4: The method of any of clauses 1-3, wherein the (meth)acrylic acid monomer comprises 2-20 weight % of the vinyl monomers.

Clause 5: The method of any of clauses 2-4, wherein the N-vinylpyrrolidone comprises 1-60 weight % of the vinyl monomers.

Clause 6: The method of any of clauses 1-5, wherein the base comprises an amine.

Clause 7: The method of any of clauses 1-6, wherein the base has a vapor pressure of ≥1 Pa at 20° C. and/or the base is provided in sufficient quantity to accomplish 100%-300% neutralization of the (meth)acrylic acid monomer.

Clause 8: The method of clause 6 or 7, wherein the amine comprises a tertiary amine.

Clause 9: The method of any of clauses 1-8, wherein the treatment composition further comprises (c) a hydrophilic polymer different from the acrylic polymer.

Clause 10: The method of any of clauses 1-9, wherein the treatment composition further comprises (d) an aminosilane.

Clause 11: The method of clause 9 or 10, wherein the hydrophilic polymer comprises a polysaccharide, polyoxazoline, polyvinylpyrrolidone, polyethylenimine, or some combination thereof.

Clause 12: The method of any of clauses 1-11, wherein the acrylic polymer has a weight average molecular weight (Mw) of up to 35,000.

Clause 13: The method of any of clauses 1-12, wherein the filler is selected from the group consisting of silica, alumina, calcium oxide, zinc oxide, magnesium oxide, titanium oxide, zirconium oxide, and mixtures thereof.

Clause 14: The method of any of clauses 1-13, wherein the filler comprises silica.

Clause 15: The method of any of clauses 1-14, wherein the treatment composition is an aqueous composition.

Clause 16: The method of clause 15, wherein the treatment composition has pH >7.

Clause 17: The method of any of clauses 1-16, wherein the conditions sufficient to effect the condensation reaction comprise drying the membrane.

Clause 18: The method of clause 17, wherein the drying occurs at a temperature ranging from 20° C.-145° C.

Clause 19: The method of any of clauses 1-18, wherein the conditions sufficient to effect the condensation reaction comprise rinsing the membrane with neutral water.

Clause 20: The method of any of clauses 1-19, further comprising: contacting the at least one surface of the membrane with a hydrophilic polymer prior to contacting the at least one surface of the membrane with the treatment composition.

Clause 21: The method of clause 20, wherein the hydrophilic polymer comprises a polysaccharide, polyoxazoline, polyvinylpyrrolidone, polyethylenimine, or some combination thereof.

Clause 22: The method of any of clauses 1-21, wherein the base is included in a sufficient quantity to accomplish at least 75% neutralization of the (meth)acrylic acid monomer.

Clause 23: A treated microporous membrane prepared by the method of clause 1.

Clause 24: The treated microporous membrane of clause 23, wherein the membrane contacted with the treatment composition is in the form of a sheet.

Clause 25: The treated microporous membrane of clause 23 or 24, wherein the membrane contacted with the treatment composition is a component of a separation device.

Clause 26: An aqueous treatment composition comprising: (a) an acrylic polymer prepared from a mixture of vinyl monomers comprising: (i) a (meth)acrylic acid monomer and (ii) a silane-functional acrylic monomer; (b) a base; (c) a hydrophilic polymer different from the acrylic polymer; and optionally (d) an aminosilane.

Clause 27: The treatment composition of clause 26, wherein: the acrylic polymer comprises 2-10 weight % of the treatment composition; the base comprises an amine and is present in a sufficient quantity to accomplish 100%-300% neutralization of the (meth)acrylic acid monomer; the hydrophilic polymer comprises 1-10 weight % of the treatment composition; and the aminosilane comprises 0.2-1.5 weight % of the treatment composition.

Clause 28: The treatment composition of clause 26 or 27, wherein the mixture of vinyl monomers further comprises (iii) N-vinylpyrrolidone.

Clause 29: Use of a treated microporous membrane of any of clauses 23-25.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method for treating a surface of a microporous membrane, the membrane comprising a polyolefinic polymeric matrix; finely divided particulate, substantially water-insoluble inorganic filler distributed throughout the matrix; and a network of interconnecting pores communicating throughout the microporous membrane,
the method comprising:
(1) contacting at least one surface of the membrane with a treatment composition comprising:
(a) an acrylic polymer prepared from a mixture of vinyl monomers comprising: (i) a (meth)acrylic acid monomer and (ii) a silane-functional acrylic monomer; and
(b) a base,
wherein the acrylic polymer is in contact with the filler present in the matrix; and
(2) subjecting the membrane of (1) to conditions sufficient to effect a condensation reaction between the filler and the acrylic polymer.

2. The method of claim 1, wherein the mixture of vinyl monomers further comprises (iii) N-vinylpyrrolidone.

3. The method of claim 1, wherein the silane-functional acrylic monomer comprises 10-80 weight % of the vinyl monomers.

4. The method of claim 1, wherein the (meth)acrylic acid monomer comprises 2-20 weight % of the vinyl monomers.

5. The method of claim 2, wherein the N-vinylpyrrolidone comprises 1-60 weight % of the vinyl monomers.

6. The method of claim 1, wherein the base comprises an amine.

7. The method of claim 1, wherein the base has a vapor pressure of ≥1 Pa at 20° C. and/or the base is provided in sufficient quantity to accomplish 100%-300% neutralization of the (meth)acrylic acid monomer.

8. The method of claim 6, wherein the amine comprises a tertiary amine.

9. The method of claim 1, wherein the treatment composition further comprises (c) a hydrophilic polymer different from the acrylic polymer.

10. The method of claim 1, wherein the treatment composition further comprises (d) an aminosilane.

11. The method of claim 9, wherein the hydrophilic polymer comprises a polysaccharide, polyoxazoline, polyvinylpyrrolidone, polyethylenimine, or some combination thereof.

12. The method of claim 1, wherein the acrylic polymer has a weight average molecular weight (Mw) of up to 35,000.

13. The method of claim 1, wherein the filler is selected from the group consisting of silica, alumina, calcium oxide, zinc oxide, magnesium oxide, titanium oxide, zirconium oxide, and mixtures thereof.

14. The method of claim 1, wherein the filler comprises silica.

15. The method of claim 1, wherein the treatment composition is an aqueous composition.

16. The method of claim 15, wherein the treatment composition has pH >7.

17. The method of claim 1, wherein the conditions sufficient to effect the condensation reaction comprise drying the membrane.

18. The method of claim 17, wherein the drying occurs at a temperature ranging from 20° C.-145° C.

19. The method of claim 1, wherein the conditions sufficient to effect the condensation reaction comprise rinsing the membrane with neutral water.

20. The method of claim 1, further comprising:
contacting the at least one surface of the membrane with a hydrophilic polymer prior to contacting the at least one surface of the membrane with the treatment composition.

21. The method of claim 20, wherein the hydrophilic polymer comprises a polysaccharide, polyoxazoline, polyvinylpyrrolidone, polyethylenimine, or some combination thereof.

22. The method of claim 1, wherein the base is included in a sufficient quantity to accomplish at least 75% neutralization of the (meth)acrylic acid monomer.

23. A treated microporous membrane prepared by the method of claim 1.

24. The treated microporous membrane of claim 23, wherein the membrane contacted with the treatment composition is in the form of a sheet.

25. The treated microporous membrane of claim 23, wherein the membrane contacted with the treatment composition is a component of a separation device.

26. An aqueous treatment composition comprising:
(a) an acrylic polymer prepared from a mixture of vinyl monomers comprising: (i) a (meth)acrylic acid monomer and (ii) a silane-functional acrylic monomer;
(b) a base;
(c) a hydrophilic polymer different from the acrylic polymer; and
optionally (d) an aminosilane.

27. The treatment composition of claim 26, wherein:
the acrylic polymer comprises 2-10 weight % of the treatment composition;
the base comprises an amine and is present in a sufficient quantity to accomplish 100%-300% neutralization of the (meth)acrylic acid monomer;
the hydrophilic polymer comprises 1-10 weight % of the treatment composition; and
the treatment composition comprises the aminosilane, and the aminosilane comprises 0.2-1.5 weight % of the treatment composition.

28. The treatment composition of claim 26, wherein the mixture of vinyl monomers further comprises (iii) N-vinylpyrrolidone.

* * * * *